United States Patent Office 3,654,202
Patented Apr. 4, 1972

3,654,202
POLYETHYLENE FILLED WITH TREATED CHRYSOTILE
Elio Eusebi, Troy, Mich., assignor to General Motors Corporation, Detroit, Mich.
No Drawing. Original application Mar. 21, 1968, Ser. No. 714,798. Divided and this application July 27, 1970, Ser. No. 58,702
Int. Cl. C08f 19/14, 21/04
U.S. Cl. 260—23 H                        3 Claims

ABSTRACT OF THE DISCLOSURE

The reacting of chrysotile with a suitable higher unsaturated fatty acid provides an improved filler material for certain synthetic resins. In a preferred form of the invention this improved filler is prepared by reacting chrysotile fibers with the sodium salt of an unsaturated higher fatty acid in an aqueous solution thereof. The treated chrysotile may then be incorporated into a synthetic resin such as a polyethylene under conditions whereby the resin is chemically combined with the unsaturated fatty acid moiety of the filler thereby providing a filled plastic having improved tensile and flexural properties.

This is a division of Ser. No. 714,798, filed Mar. 21, 1968, now abandoned.

---

This invention relates to the preparation and use of an asbestos-type filler in synthetic resins. More particularly it relates to a modified chrysotile filler which may be incorporated into suitable synthetic resins to provide improved tensile and flexural strengths.

Asbestos is presently used in plastics as a filler, extender, and/or reinforcement. Chrysotile is one of the forms of asbestos which finds use in such applications. It is already known that if the chrysotile is purified by the elimination of extraneous minerals before being incorporated into a synthetic resin the resulting filled resin displays improved physical properties. It is also recognized that by reacting relatively pure chrysotile with stearic acid, a saturated higher fatty acid, the surface of the chrysotile is more readily wet by a synthetic resin so as to provide for improved contact between the modified chrysotile filler and the resin matrix. However, there is a further need to improve the physical properties of filled synthetic resins beyond that which was heretofore possible in the art. It is also desirable to accomplish this improvement by employing relatively inexpensive conventional resins and filler materials.

Accordingly, it is an object of the present invention to provide a method of chemically treating the surface of chrysotile fibers whereby the treated material may be incorporated into suitable synthetic resins and chemically combined therewith to obtain improved physical properties.

It is a more specific object of the present invention to provide a method of treating chrysotile wtih unsaturated organic substances such as unsaturated higher fatty acids so that chemical bonding can be obtained under suitable circumstances between the treated filler and a synthetic resin matrix.

It is another object of the present invention to provide an improved chrysotile-based filler material wherein chrysotile fibers are chemically bonded at the surface thereof to an unsaturated higher fatty acid.

It is a still further object of the present invention to provide improved filled synthetic resins, such as a modified chrysotile-filled polyethylene, wherein chemical bonding is obtained between the resin and the modified chrysotile, the filled resin having markedly improved physical properties.

In accordance with the invention, these and other objects are accomplished in a preferred embodiment thereof by reacting substantially pure chrysotile fibers with a suitable higher unsaturated fatty acid or an alkali metal salt thereof. Preferably, chrysotile fibers are reacted with a water soluble sodium salt of a mono- or poly-unsaturated fatty acid containing at least eight carbon atoms. In this embodiment of the invention the chrysotile fibers are slurried in an aqueous solution of the fatty acid salt at about normal room temperature for a suitable time whereby the salt reacts with the hydroxy groups at the surface of the chrysotile fiber depositing the acid moiety thereon. The chrysotile is thus modified in that the reaction product is characterized by a number of unsaturated fatty acid chains extending from the original surface of the fibers. The reaction product is removed from the solution, washed and dried.

The modified filler is then incorporated into a suitable synthetic resin such as polyethylene under circumstances in which resin molecules react with the filler material at the double bond(s) of the fatty acid moiety to provide a chemical bond between the filler and the resin. Under these desirable circumstances the strength of the filled resin is markedly improved as may be detected in its tensile modulus and strength as well as its flexural modulus and strength.

These and other objects of the invention will become more apparent from a detailed description thereof which follows.

Chrysotile is the serpentine variety of asbestos fiber. The empirical composition of chrysotile is: $3MgO \cdot 2SiO_2 \cdot 2H_2O$. However, the unit cell has been represented as $Mg_6(OH)_8Si_4O_{10}$. In general, chrysotile fibers are considered to be cylindrical with an average outer diameter of 200 to 250 angstroms. The length of the fibers may vary substantially depending upon processing history, but preferably are employed in the present invention as short fibers having a length of the order of 100 times their diameter. It is known that there are hydroxy groups extending outwardly in the surface of the chrysotile fibers. These groups are attached to magnesium atoms and the chrysotile does display a basic reaction when slurried in water, acting somewhat like magnesium hydroxide. In accordance with my invention, the surface of the chrysotile fiber is treated with suitable unsaturated fatty acids containing at least eight carbon atoms whereby a bond is formed between the acid group of the fatty acid and the hydroxy groups of the chrysotile fiber so that reactive ethylenically unsaturated carbon chains extend from the surface thereof. Thus, this filler may be incorporated into synthetic resins such as polyethylene in a manner such that either during the mixing step, or thereafter, a chemical bond is formed between the resin and the ethylenically unsaturated carbon chain protruding from the chrysotile fiber. In this manner a chemical bond is formed between the filler material and the resin thereby advantageously strengthening the composite.

I have found that the higher unsaturated fatty acids, preferably those having eight or more carbon atoms, more readily react with the hydroxyl groups of the chrysotile to form my improved filler. These higher fatty acids must be ethylenically unsaturated, and may have more than one ethylenic double bond per molecule. The reaction is most readily, and therefore preferably, carried out employing a sodium salt, or other suitable alkali metal salt, of the fatty acid in an aqueous solution thereof. Under these circumstances a relatively dilute aqueous solution of the sodium salt of the unsaturated fatty acid, for example 1% to 2% by weight, is prepared. The chrysotile fibers are slurried in the aqueous solution at normal room temperature for about thirty minutes and then filtered, washed and dried. I have found that about 20 to 50 milliequivalents of unsaturated fatty acid (or alkali metal salt thereof) per 100 grams of chrysotile is suitable to obtain the benefits of my invention.

Examples of suitable unsaturated fatty acids include: 4-decenoic (obtusilic), cis-9-decenoic (caproleic), 10-undecenoic, cis-9-dodecenoic (lauroleic), 5-tetradecenoic (physeteric), cis-9-tetradecenoic (myristoleic), cis-9-hexadecenoic (palmitoleic), cis-6-octadecenoic (petroselinic), trans-6-octadecenoic (petroselaidic), cis-9-octadecenoic (oleic), trans-9-octadecenoic (elaidic), trans-11-octadecenoic (avccenic), cis-9-eicosenoic (gadoleic), 11-docosenoic (cetoleic), cis-13-docosenoic (euric), trans-13-docosenoic (brassidic), cis-15-tetracosenoic, selacholeic, 17-hexacosenoic (xiemenic), 21-triacontenoic (lumequoic), cis-9,cis-12-octadecadienoic, linoleic, trans-9,trans-12-octadecadienoic (linolelaidic), 6,10,14-hexadecatrienoic (hiragonic), α-eleostearic, β-eleostearic, 9,11,13-octadecatrienoic(punicic), cis-9,cis-12,cis-15-octadecatrienoic (linolenic), trans - 10,trans - 12,trans - 14 - octadecatrienoic (psuedoeleostearic), 4,8,12,15-octadecatetraenoic (moroctic), 9,11,13,15-octadecatetraenoic (α-parinaric), 9,11,-13,15-octadecatetraenoic (β-parinaric), 5,8,11,14-eicosatetraenoic (arachidonic) and mixtures thereof.

A specific example of the preparation of modified chrysotile fibers and their subsequent incorporation into a synthetic resin will further illustrate the practice and advantages of my invention.

EXAMPLE 1

Clean, pure chrysotile fibers having a diameter of about 0.025 to 0.035 micron and a length of about 2½ to 3½ microns were employed. Chrysotile fibers were slurried in water at a ratio of about 50 grams of chrysotile per liter of water. To the slurry was added a 1% by weight solution of sodium linoleate in water such that 40 milliequivalents per 100 grams of chrysotile was added. This relatively dilute slurry was mixed for about thirty minutes at normal room temperature and then filtered. The modified-chrysotile filter cake was washed with water and dried in a vacuum oven overnight at 190° F. The dried, treated chrysotile was then broken up in a Waring Blender.

Another like batch of chrysotile was slurried in water and reacted in the way described above with an aqueous solution of sodium stearate, a saturated fatty acid. This latter procedure has been practiced in the prior art to provide a filler material which could be more readily wetted by an organic material compatible with aliphatic carbon chains.

Three distinct batches of filled polyethylene were then prepared. The first batch contained 36 parts by weight of untreated chrysotile per 100 parts of polyethylene. The second batch contained 36 parts of sodium stearate treated chrysotile per 100 parts of polyethylene and the third batch contained 36 parts of sodium linoleate treated chrysotile per 100 parts of polyethylene. Polyethylene having a density of 0.95 gram per cubic centimeter and a melt index of 5.0 was employed. In each instance the chrysotile-filled polyethylene was prepared by mixing the resin and the chrysotile on a hot, two-roll mill for about fifteen minutes. The temperature of the mill was maintained at 300° F. The mixtures were peeled off of the mill in the form of a sheet and allowed to cool to about normal room temperature. The cool, filled sheet was then ground up and injection molded into flexural test bars. The flexural bars were 4" x 1" x ⅛" in accordance with the ASTM D-790. A number of flexural test bars were tested from each of the above-described batches of filled polyethylene. The average flexural strength of the bars formed of polyethylene filled with untreated chrysotile was 3550 p.s.i. The average flexural strength of polyethylene filled with sodium stearate treated filler was 3460 p.s.i. In contrast, the test bars molded from polyethylene filled with sodium linoleate treated chrysotile had an average flexural strength of 4550 p.s.i.

EXAMPLE 2

As in Example 1, three different batches of filled polyethylene were prepared, however, in each group in this example 65 parts of chrysotile were incorporated into 100 parts of polyethylene. One of the batches of filled polyethylene contained untreated chrysotile, a second batch of filled polyethylene contained chrysotile treated with sodium stearate and the third batch of filled polyethylene contained chrysotile treated with sodium linoleate. Both flexural and tensile specimens were prepared from the filled polyethylene and the flexural modulus, flexural strength, tensile modulus and tensile strength and tensile elongation were respectively determined in accordance with ASTM test procedures D-638 and D-790. The average results are tabulated below.

|  | Flexural | | Tensile | | |
| --- | --- | --- | --- | --- | --- |
|  | Modulus | Strength | Modulus | Strength | Elongation (percent) |
| Filler not treated | 333,500 | 6,080 | 312,200 | 5,020 | 5.0 |
| Chrysotile treated w/sodium stearate | 380,600 | 6,650 | 682,300 | 4,840 | 5.1 |
| Chrysotile treated w/sodium linoleate | 489,600 | 7,240 | 664,400 | 5,320 | 2.4 |

The marked improvement in flexural and tensile properties of polyethylene filled with sodium linoleate treated chrysotile is attributed to the formation of a chemical bond between the polyethylene matrix and the ethylenically unsaturated fatty acid moiety. It is believed that during the mixing of the polyethylene and treated chrysotile on the hot mill free radicals are formed in the polyethylene chains. Some of these free radicals react with the fatty acid groups extending from the chrysotile at the positions of ethylenic unsaturation. Apparently in this way polyethylene becomes bonded to the filler.

In accordance with my invention, unsaturated fatty acid modified chrysotile may advantageously be employed in other suitable synthetic resins in which free radicals thereof can be produced either during or after the incorporation of the modified chrysotile. Examples of suitable resins are polypropylene, polyester-vinyl resin copolymers and the multifarious vinyl homopolymer and copolymer resins. In resins of this type free radicals may be produced in the resin molecule either by the existence of suitable physical conditions which spontaneously produce free radicals or the presence of a free radical producing component such as a peroxide. In either case the resin free radical can react with the modified chrysotile to form a chemical bond therebetween, which bond results in improved physical properties in the composite material.

While my invention has been described in terms of the preferred embodiment thereof, it will be appreciated that other forms might readily be adopted by one skilled in the art, therefore, my invention should be considered limited only by the scope of the following claims.

What is claimed is:

1. A filled polyethylene resin comprising polyethylene and a filler which is the reaction product of chrysotile fibers with an alkali metal salt of an ethylenically unsaturated fatty acid containing at least eight carbon atoms, the unsaturated fatty acid moieties in said reaction product being attached at the acid groups thereof to the surfaces of said chrysotile fibers, polyethylene molecules in said filled resin being chemically bonded to said fatty acid groups at the positions of ethylenic unsaturation by reaction at about 300° F. whereby said filled resin is characterized by the existence of chemical bonds between the polyethylene and chrysotile fibers through said fatty acid.

2. A method of preparing chrysotile-filled polyethylene resins comprising slurrying chrysotile fibers in an aqueous solution of an alkali metal salt of an unsaturated fatty acid containing at least eight carbon atoms so as to react the acid group of said salt with hydroxy groups on said fibers and thereby chemically bond the unsaturated fatty acid moiety to said chrysotile fibers, removing said fibers from said solution, drying said fibers, and mixing the treated chrysotile fibers with a polyethylene resin on a hot mill which is at about 300° F. to obtain a filled polyethylene composition in which there are chemical bonds between said treated chrysotile fibers and polyethylene molecular chains.

3. A method of preparing chrysotile filled polyethylene resins comprising slurrying chrysotile fibers in an aqueous solution of the sodium salt of an unsaturated fatty acid containing at least eight carbon atoms so as to react said salt with hydroxy groups on said fibers and thereby chemically attaching the unsaturated fatty acid moiety to said chrysotile fibers, there being employed 20 to 50 milliequivalents of said sodium salt per 100 grams of chrysotile fibers slurried in said solution, removing said fibers from said solution, drying said fibers and mixing the treated chrysotile fibers with a polyethylene resin on a hot mill which is at about 300° F. to obtain a filled polyethylene composition in which there are chemical bonds between said treated chrysotile fibers and polyethylene molecular chains.

References Cited

UNITED STATES PATENTS

| | | | |
|---|---|---|---|
| 2,626,213 | 1/1953 | Novak | 106—308 |
| 3,304,197 | 2/1967 | Pundsack et al. | 106—308 |
| 3,503,919 | 3/1970 | Cadus | 260—37 |
| 3,519,593 | 7/1970 | Bolger | 260—41 |

OTHER REFERENCES

"Polyethylene," by Raff et al. (1956), pp. 403, 404.

DONALD E. CZAJA, Primary Examiner

D. J. BARRACK, Assistant Examiner

U.S. Cl. X.R.

23—110 R; 260—41 A